Oct. 2, 1956

E. M. AMIR 2,765,218

ANALYSIS OF SULFURIC ACID

Filed Aug. 7, 1953

INVENTOR.
Emanuel M. Amir,
BY
ATTORNEY.

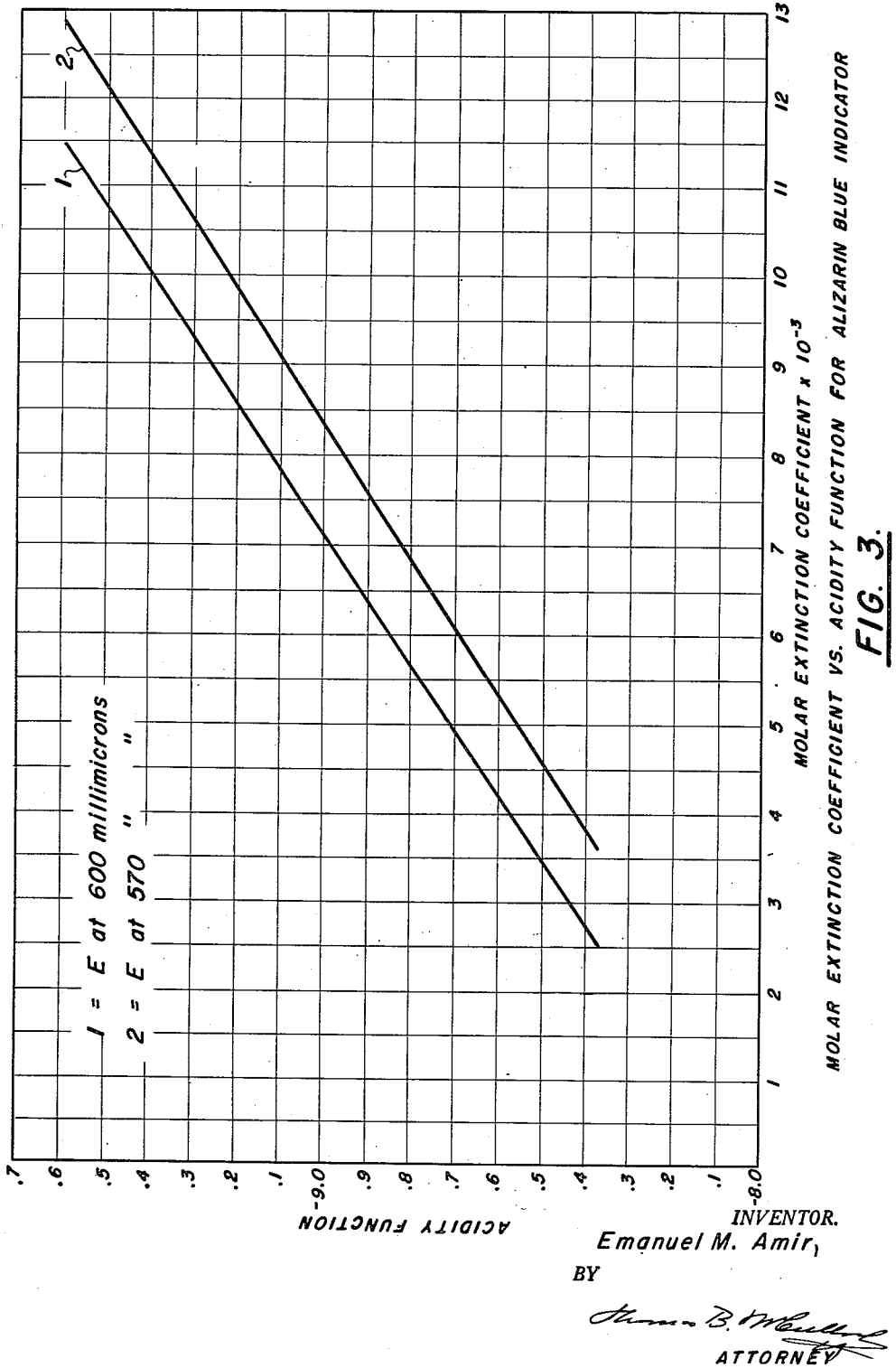

United States Patent Office 2,765,218
Patented Oct. 2, 1956

2,765,218

ANALYSIS OF SULFURIC ACID

Emanuel M. Amir, Baytown, Tex., assignor, by mesne assignments, to Esso Research and Engineering Company, Elizabeth, N. J., a corporation of Delaware Application August 7, 1953, Serial No. 372,858

4 Claims. (Cl. 23—230)

The present invention is directed to a sulfuric acid alkylation process. More particularly, the invention is directed to a sulfuric acid catalyzed alkylation reaction in which an isoparaffin and an olefin are reacted in contact with sulfuric acid. In its more specific aspects, the invention is directed to a method for maintaining catalyst activity in the sulfuric acid catalyzed alkylation of isoparaffins and olefins.

The present invention may be briefly described as a method for maintaining catalyst activity in a sulfuric acid catalyzed alkylation reaction in which an isoparaffin and an olefin are contacted in a circulating system with a sulfuric acid of an alkylation strength, the sulfuric acid gradually losing its strength for the alkylation reaction requiring withdrawal of a portion of the sulfuric acid in the system and replacing the withdrawn portion of sulfuric acid with sulfuric acid of an alkylation strength. The particular feature of the present invention involves withdrawing from the circulating system an acid stream containing hydrocarbons from which the hydrocarbons are separated. The separated acid is then divided into a first and a second stream and to the second stream is added a solution of sulfuric acid containing alizarin blue. The first stream and the second stream to which alizarin blue has been added are then separately exposed to light having a wave length in the range from about 5000 to about 7000 A. to obtain an electrical signal which is a measure of the optical density of the acid containing alizarin blue in the second stream. The electrical signal is then employed to withdraw sulfuric acid from the system and to replace the withdrawn sulfuric acid with sulfuric acid of an alkylation strength when the optical density of the acid in the second stream falls below a preselected point.

In the alkylation of isoparaffins and olefins in the presence of sulfuric acid of an alkylation strength, the sulfuric acid gradually becomes contaminated or fouled with carbonaceous matter such that it rapidly becomes relatively opaque. The buildup of carbonaceous material in the acid acts as a diluent and causes a drop in titratable acidity. Furthermore, water is also picked up from the hydrocarbon reactants and causes the acid to lose its strength. Taken together, the carbonaceous material and the water cause the sulfuric acid as a catalyst to fall in titratable acidity and to lose gradually its ability to catalyze the alkylation reaction. The drop in titratable acidity may be due to either or both buildup of carbonaceous matter or absorption of water in the acid. It will be seen, therefore, that titratable acidity may not be a correct measure of the alkylation strength of the acid.

Such acids are opaque to light in the ultraviolet and the higher regions of the visible spectrum. However, while such acids are completely opaque to these regions, the alkylation acids which are fouled with carbonaceous materials are partially transparent to the yellow and red wave lengths. Thus it is possible to control an alkylation reaction by employing the acidity function which is a measure of the ability of a solution to transfer a proton to a neutral solute. The acidity function is well known in the literature and a complete discussion thereof may be found in the work by Hammett and Deyrup, Journal of American Chemical Society, 54, 2721 (1932), and the work by Hammett reported in Chemical Reviews, vol. 16, 67 (1935), and also by Hammett and Paul, Journal of American Society, 56, 827 (1934). However, the acidity function could not be used in controlling the alkylation reactions until a suitable indicator was found which would satisfy the requirements that it absorbed in the region of 5000 to 7000 A. and that its color would change in the range of acidity functions corresponding to 91% to 99% $H_2SO_4$. Also the indicator necessary in the practice of the present invention must obey Beer's law. Further it was necessary that the light absorption of the indicator would vary slightly, say less than 3% in a solution of 96% $H_2SO_4$ after standing for three months. Another factor required for an indicator employed in the present invention must be that it would have a very large change in molar extinction coefficient with a small change in acidity function. Alizarin blue, for example, has a change in molar extinction coefficient of 9500 units for an average change in acidity function of 1.25 units.

Alizarin blue is the only indicator found which fulfills all the requirements necessary to be used in measuring the acidity function of sulfuric acid employed in alkylation reactions.

In conducting the present invention, a sample of acid from a sulfuric acid alkylation reactor is continuously withdrawn and the hydrocarbon first separated by any convenient means of separation, such as by gravitational settling or centrifuging. The acid, after separation of hydrocarbons, is then divided into two streams. The first of these streams is passed directly through the background absorption cell of a spectrophotometer and the second stream is mixed with alizarin blue in a sulfuric acid solution in a fixed ratio as required to obtain the desired level of alizarin blue concentration and final solution. After adding the indicator to the second stream, the second stream is then passed through the second sample absorption cell of a spectrophotometer. The absorption cells are then scanned by light of a suitable wave length in the spectrophotometer in the region from about 5000 to 7000 A. The acidity function is a linear function of the molar extinction coefficient of alizarin blue at suitable wave lengths. Therefore, when the concentration of alizarin blue in the sample and the thickness of the absorption cell are held constant, the acidity function becomes a linear function of the optical density. An electrical signal is obtained from the spectrophotometer which is a measure of the optical density of the sulfuric acid containing alizarin blue in the second stream. This signal may be amplified if necessary and then employed to control a valve which withdraws sulfuric acid from the system and admits sulfuric acid of an alkylation strength to the system to maintain the strength of the acid at the proper point. The signal can be obtained when the optical density falls below a preselected point to withdraw acid and to admit acid to replace the withdrawn acid.

The invention may be used to control the catalyst activity in a single or in a plurality of sulfuric acid alkylation reactors.

The present invention will be further illustrated by reference to the drawing in which Fig. 1 is a flow sheet of a preferred mode of practicing the invention;

Fig. 3 is a chart showing a plot of data of the observed molar extinction coefficients of alizarin blue at 570 and 600 millimicrons wavelength plotted against the acidity function.

Figure 1:
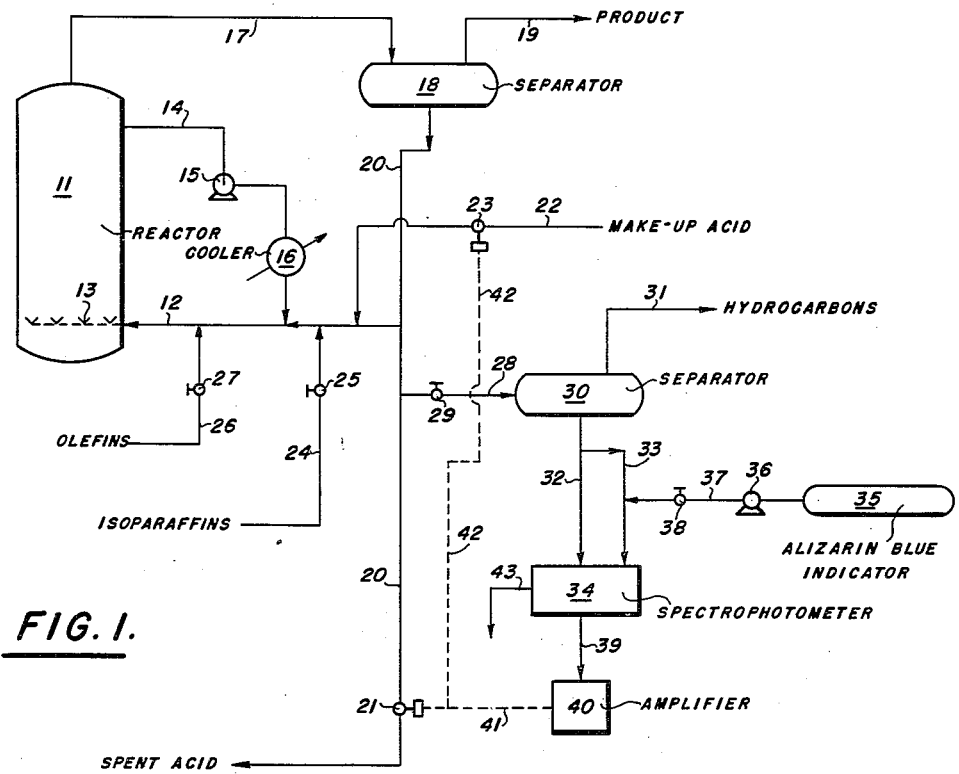

Referring now to the drawing and particularly to Fig. 1, numeral 11 designates an alkylation reactor in which hydrocarbons are reacted, for example, isoparaffins and olefins. A reaction mixture is introduced into alkylation reactor 11 through line 12 from a source which will be described further and sprayed upwardly into the reactor 11 through a plurality of sprays or jets 13. An emulsion of acid and hydrocarbons results in the reactor 11, the hydrocarbon being partially alkylate and partially unreacted hydrocarbons. This emulsion may be withdrawn from alkylation reactor 11 by line 14 and circulated back to line 12 by pump 15 which causes the emulsion to pass through a cooler 16 in line 14 to remove the heat of reaction and discharge the cooled emulsion back into line 12.

A mixture of acid and reacted and unreacted hydrocarbon is withdrawn from reactor 11 by way of line 17 which discharges the mixture into a separation zone 18 in which a separation is made between the alkylate which contains unreacted hydrocarbons and the acid, the alkylate being withdrawn from separator 18 by line 19 while the acid is withdrawn from separator 18 by line 20. Line 12 connects into line 20 and serves to return at least a portion of the acid from line 20 to reactor 11 for re-use in the process.

As stated before, the acid circulating in the system from reactor 11 to separator 18 and thence back to reactor 11 by line 12 gradually becomes fouled with carbonaceous matter and diluted with water. This causes the acid to lose its alkylation strength and, therefore, it becomes necessary to withdraw a portion of the acid from time to time. To this end, valve 21 is provided in line 20 for withdrawal of spent acid. However, to maintain the acid strength, it is necessary to introduce fresh acid of alkylation strength into the system; therefore, provision is made to introduce into line 12 by line 22 controlled by valve 23 an amount of makeup acid sufficient to correspond to the amount of acid withdrawn by line 20 when opening valve 21.

Connecting into line 12 are line 24 controlled by valve 25 and line 26 controlled by valve 27 through which are introduced into line 12 isoparaffins and olefins, respectively. Thus it will be seen that the isoparaffins and olefins are admixed with the circulating acid and emulsion in the system to allow the alkylation reaction to proceed in reactor 11.

It is desirable that the isoparaffins be in excess of the olefins for the alkylation reaction. The isoparaffins are, therefore, employed in excess of olefins. For example, an isoparaffin-olefin ratio in the range from 2:1 to 20:1 gives desirable results.

In order to control the aforesaid alkylation reaction and to maintain the acidity function at the proper level for control of the acid strength in accordance with the present invention, a portion of the acid in line 20 is withdrawn from line 20 by line 28 controlled by valve 29 into a separation zone 30 which may be a separation zone, such as separator 18, which is of sufficient capacity to allow separation by gravity of unentrained or suspended or dissolved hydrocarbons in the acid. Separation zone 30 is an auxiliary separation zone and separator 18 may be used in lieu thereof. In any event, if any hydrocarbons are contained in the acid they are separated in the top of zone 30 and removed by line 31. The acid substantially freed of hydrocarbons in separator 30 is withdrawn by line 32 and divided into two streams, one stream flowing by line 32 and the other by line 33. The first stream flowing by line 32 is passed into an absorption cell, not shown, of a spectrophotometer 34 which is shown schematically and is of a well-known type. The second stream in line 33 has admixed with it a sulfuric acid solution of alizarin blue which is withdrawn from tank or drum 35 and pumped by a metering pump 36 through line 37 controlled by valve 38 into line 33. The acid in line 33 now containing alizarin blue is passed into a second cell of spectrophotometer 34 and the two sample cells are then exposed to light of a suitable wave length in the range from 5000 to 7000 A. to obtain an electrical signal. This electrical signal is a measure of the optical density of the acid in line 33. This signal may be passed through a conductor 39 into a suitable amplifier 40 also shown schematically and the electrical signal then employed to control valves 21 and 23 through electrical conductors 41 and 42. Thus when the optical density of the acid circulating in the system from reactor 11 to separator 18 and back to reactor 11 falls below a value corresponding to a molar extinction coefficiently about 3500 when light of wavelength of 6000 A. is used, the valves 23 and 21 would be opened and closed, respectively, to admit and withdraw acid such to maintain the optical density at above the value corresponding to a molar extinction coefficient of about 10750 when light of wavelength of 6000 A. is used.

Figure 2:
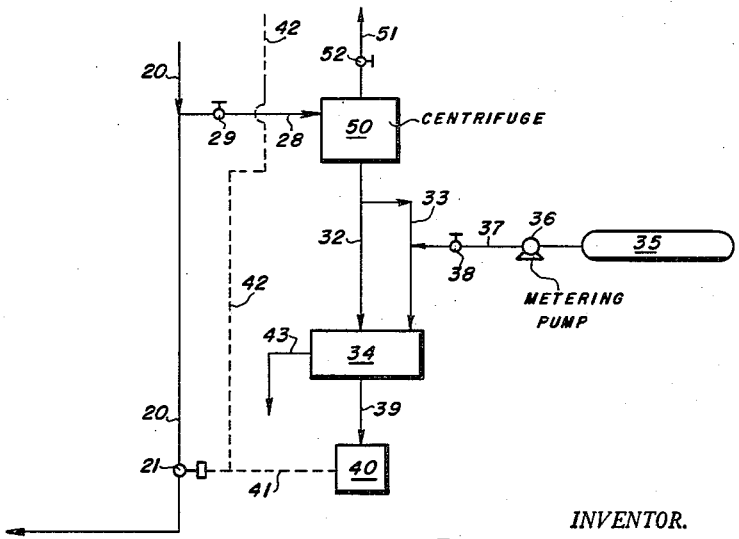
Fig. 2 shows a modification of the apparatus of Fig. 1.

Referring now to Fig. 2 in which identical numerals will be employed to designate identical parts, the separator 30 of Fig. 1 has been replaced by another separation means, such as a centrifuge 50 which may be of a sufficient size and capacity to separate substantially completely any hydrocarbons from the acid. These hydrocarbons may be withdrawn by line 51 controlled by valve 52 while the acid from which the hydrocarbons have been separated flow, as has been described, by way of lines 32 and 33 to spectrophotometer 34 to obtain a signal.

Since the acid flowing from at least one of the sample cells from spectrophotometer 34 contains alizarin blue, it may be undesirable to discharge this acid back into the acid in line 21 since the acid may then be reconcentrated and treated for re-use in the alkylation reaction. Therefore, I prefer to discharge the acid from spectrophotometer 34 from the system by line 43.

Referring now to Fig. 3 which is a plot of observed molar extinction coefficient of alizarin blue at wave lengths of 570 and 600 millimicrons vs. acidity function, these curves were obtained by determining the molar extinction coefficient of various solutions of alizarin blue in sulfuric acid having different concentrations. The acids employed in obtaining the data in Fig. 3 ranged in strength from 91.06% to 98.71% $H_2SO_4$.

In order to show the relationship between molar extinction coefficient and the acidity function, the following data were obtained on samples of fresh alkylation acid and several spent alkylation acids:

| Alkylation Acid | Titratable Acidity | Acidity Function | Percent Acid in Acid-Water Mixture Corresponding to Observed Acidity Function | Extinction Coefficient | |
|---|---|---|---|---|---|
| | | | | 5700 A. | 6000 A. |
| Fresh | 98.4 | −9.42 | 98.5 | 11,550 | 10,160 |
| Spent | 92.8 | −9.14 | 97.5 | 9,440 | 8,150 |
| Do | 92.2 | −9.03 | 96.8 | 8,610 | 7,340 |
| Do | 92.9 | −9.16 | 97.6 | 9,580 | 8,280 |
| Do | 91.8 | −8.94 | 96.3 | 7,920 | 6,680 |

The molar extinction coefficient of alizarin blue may suitably be determined by measuring optical density of sulfuric acid solutions of alizarin blue by exposure to light of the wave length from about 5000 to about 7000 A. For example, 0.10 ml. portions of 0.01145 molar solution of alizarin blue in 96% C. P. sulfuric acid may be diluted to 25.0 ml. with each of several acid samples over a range covered by the strength of the acid mentioned before. Light absorption cells of 1.00 cm. path length in a model DU Quartz Spectrophotometer, such as manufactured by Beckman Instruments, Inc., may be used. The molar extinction coefficient may then be calculated from the following:

$$E = \frac{a}{lc}$$

where $E$ = molar extinction coefficient
$a$ = the measured optical density
$l$ = optical path length of absorption cell in cm.
$c$ = molarity of alizarin blue in the solution In employing the present invention, crude alizarin blue may be crystallized from toluene and dried at 85° C. under vacuum. Alizarin blue prepared by this technique has a melting point of 268°–269° C. against a reported melting point of alizarin blue of 268°–270° C. A solution of approximately 0.01 M of alizarin blue may then be prepared in concentrated C. P. sulfuric acid of about 96% concentration by weighing accurately 0.0728 gram of alizarin blue and dissolving same in 96% sulfuric acid make up to volume in 25.0 ml. The molarity of this alizarin blue is equal to 0.01 times the weight of the sample divided by 0.0728. 0.10 ml. of the above alizarin blue solution may then be diluted with the unknown acid to 25.0 ml. and the molar extinction coefficient (E) of the solution obtained by adding the indicator to the unknown acid and then comparing spectrophotometrically with the unknown acid to determine the optical density or adsorbance ($a$) at about 5700 and about 6000 A. If an absorption cell of alizarin blue of 1.00 cm. does not transmit enough light, cells of 0.1 cm. may be used. Thus the molar extinction coefficient (E) may be determined from the following equation:

$$E = \frac{a x \text{ volume of unknown acid } (25.0 \text{ ml.})}{\text{Path length in cm. } x \text{ molarity of indicator soln } x \text{ volume of indicator used } (0.1)}$$

The acidity function from the molar extinction coefficient may then be read from Fig. 3, or calculated from equations:

$-Ho = 1.378 \times 10^{-4} E_{600} + 8.020$ for values of extinction coefficient at 6000 A. between the limits 2500 to 11500

$-Ho = 1.323 \times 10^{-4} E_{570} + 7.895$ for values of extinction coefficient at 5700 A. between the limits 3500 to 13000

The isoparaffins employed in the present invention may be isoparaffins such as isobutane, isopentane, isohexane, isoheptane and the like and cyclicparaffins with alkyl or aryl side chains.

The olefins may suitably be propylene, butylene, pentylene, hexylene, heptylene and many others of the same homologous series as well as cyclic olefins.

The invention is not to be limited to isoparaffins and olefins since other hydrocarbons may be suitably reacted in the presence of sulfuric acid. As examples of such hydrocarbons may be mentioned the alkylation of benzene and its homologues with olefins and catalytic polymerization of olefins.

The alkylation reaction is suitably conducted at a temperature in the range from about 20° to about 200° F. When alkylating the isoparaffins and olefins, as mentioned before, temperatures in the range from about 20° to about 100° F. are preferably employed.

The nature and objects of the present invention having been completely described and illustrated, what I wish to claim as new and useful and to secure by Letters Patent is:

1. A method for analyzing substantially hydrocarbon-free sulfuric acid having a strength in the range between 91% and 99% $H_2SO_4$ contaminated with carbonaceous material and opaque to light in the ultra-violet and higher regions of the visible spectrum but partially transparent to the yellow and red wave lengths which comprises dividing said contaminated acid into a first and second stream, adding 0.1 ml. of an approximately 0.01 molar solution of alizarin blue in sulfuric acid having a strength in the range between 91% and 99% $H_2SO_4$ to 25 ml. of said second stream, and then separately exposing said first stream and said second stream containing said alizarin blue in a spectrophotometer to light having a wave length in the range from about 5000 to 7000 A. to obtain an electrical signal which is a measure of the optical density of the contaminated acid in the second stream containing alizarin blue, whereby the acidity function of said contaminated acid is determined.

2. A method in accordance with claim 1 in which the contaminated acid is alkylation acid employed in catalyzing alkylation of alkylatable hydrocarbons.

3. A method in accordance with claim 1 in which the contaminated acid is alkylation acid employed in catalyzing alkylation of an isoparaffin and olefin.

4. A method in accordance with claim 1 in which the contaminated acid is alkylation acid employed in catalyzing alkylation of isobutane and butylene.

References Cited in the file of this patent

UNITED STATES PATENTS

| | | |
|---|---|---|
| 2,063,140 | Allison | Dec. 8, 1936 |
| 2,425,531 | Haseltine et al. | Aug. 12, 1947 |
| 2,518,307 | Groebe | Aug. 8, 1950 |
| 2,592,063 | Persyn, Jr. | Apr. 8, 1952 |

OTHER REFERENCES

Nichols et al.: Analytical Chem., vol. 22, No. 6 (June 1950), pages 785–791.

Kolthoff and Rosenblum: "Acid Base Indicators," the Macmillan Co. (1937), page 159.